D. M. CUMMINGS,

Assignor, by mesne assignments, to the COMPOUND LUMBER Co.

Compound Lumber.

No. 8,807. Reissued July 15, 1879.

Witnesses:

Thos. Houghton.

M Gardner

Inventor:

Daniel M. Cummings

By James A. Skilton

Att'y

N. PETERS, PHOTO-LITHOGRAPHER, WASHINGTON, D. C.

UNITED STATES PATENT OFFICE.

DANIEL M. CUMMINGS, OF ENFIELD, NEW HAMPSHIRE, ASSIGNOR, BY MESNE ASSIGNMENTS, TO THE COMPOUND LUMBER COMPANY, OF NEW YORK CITY.

IMPROVEMENT IN COMPOUND LUMBER.

Specification forming part of Letters Patent No. 183,042, dated October 10, 1876; Reissue No. 8,807, dated July 15, 1879; application filed November 11, 1878.

*To all whom it may concern:*

Be it known that I, DANIEL M. CUMMINGS, of Enfield, in the county of Grafton and State of New Hampshire, have invented certain Improvements in the Manufacture of Lumber, of which the following is a specification.

The object of my invention is to provide a composite lumber, in which a backing of cheap wood is united to a face of more expensive material in the manner hereinafter described, so as to form a single structure, the backing and face consisting each of one or more sections or varieties of wood, as utility or ornament may require.

Figure 1:
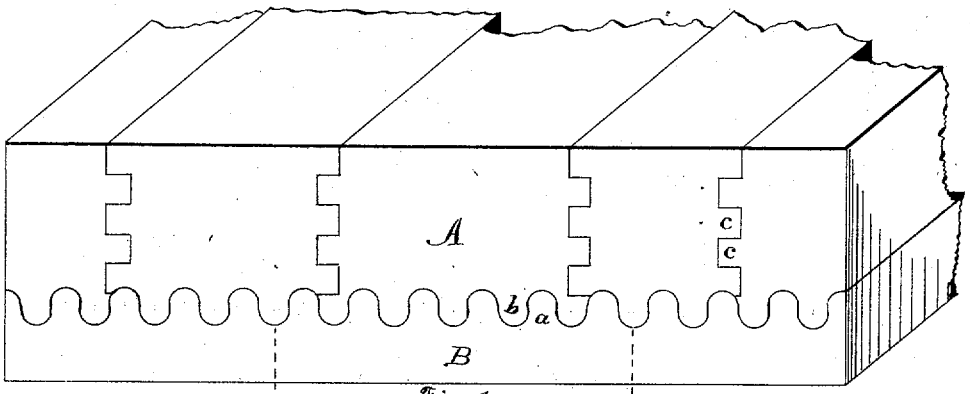
Figure 2:
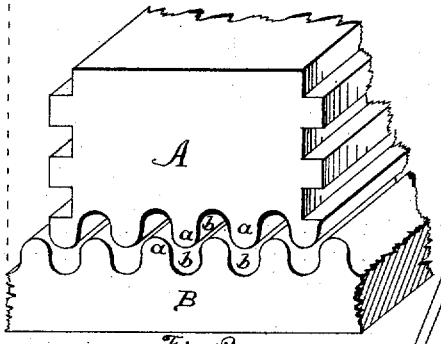
Figure 4:
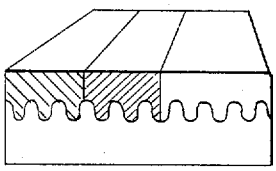
Figure 6:
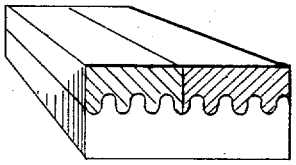
Figure 5:
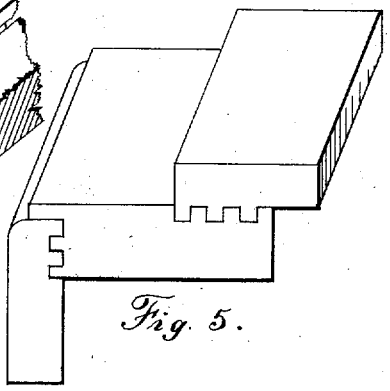
Figure 3:
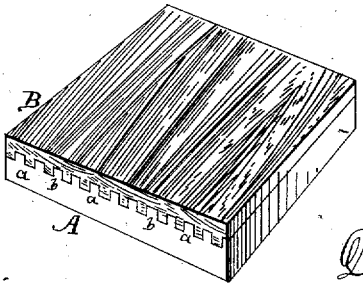

In the accompanying drawings, Figure 1 is a perspective view of a piece of composite lumber made in accordance with my invention, and Fig. 2 a view showing sections of the lumber detached. Fig. 3 is also a perspective view of a piece of the lumber. Figs. 4, 5, and 6 are views showing various forms of compound lumber produced by employing different methods of applying my invention.

A represents the backing and B the face portion of the lumber, the latter consisting of the expensive wood required for giving finish and ornamental effect, and the former being composed of cheaper material, which imparts the requisite body, and, in some instances, adds to the strength. At the back of the facing-section are formed a series of alternate ribs, *a*, and grooves *b*, adapted to coinciding ribs and grooves of the backing, so that when the two are united under pressure the ribs of one section will enter the grooves of the other, the parts being so proportioned that the friction between the sides of the tongues will serve, in many instances, to bind the sections together. For greater security glue or other cement may be used, a very small portion of which will unite the different parts of the structure to form, practically, one piece.

The backing and facing may each consist of a single piece of wood, or may be built up of a series, each section of which is united to the others in the same manner as the backing and facing are united to each other; and these sections may consist of wood of different kinds or colors, as utility or ornament may render advisable.

The composite lumber, while much cheaper than solid lumber of corresponding size of the same material as the facing, may be applied and used in the same manner as the latter, and in many instances is superior thereto, being stronger, less liable to warp and shrink, and in some cases requiring less labor in the construction of articles made therefrom—as, for instance, in the construction of heavy doors, which may be made directly from the composite lumber.

It will also be apparent that the composite lumber may be used with advantage in the manufacture of moldings and for ornamental purposes—as in parquetry, marquetry, &c., the cutting of the lumber transversely or at various angles serving to display the different materials of which it is composed in an ornamental manner at the cut surfaces.

I am aware that different kinds of wood have been united through the medium of dovetailed grooves and projections; but it is apparent that, owing to the necessity of sliding the dovetails into the grooves, such a mode of union is impracticable in a compound lumber where strips of many feet in length must be joined.

I claim as my invention—

1. As a new article of manufacture, compound lumber composed of different woods united at their inner faces by means of parallel tongues and grooves, substantially as described and shown, for the purposes set forth.

2. The improved system of veneering consisting in grooving both the wood and the veneer to match and hold by friction and pressing them together, substantially as herein set forth.

3. The facing-section B, provided with a series of alternate ribs and grooves adapted to coinciding ribs and grooves of the backing A, the parts being so proportioned that the friction between the sides of the tongue will serve to bind the sections together when united under pressure.

4. Parquetry and marquetry composed of the compound lumber shown and described, cut transversely or at various angles, so as to display the different materials of which it is composed in an ornamental manner at the cut surfaces.

5. The improved article of manufacture consisting of two or more layers of wood joined together, the adjacent surfaces of which are provided with small tongues and grooves and holding by friction, as shown and described.

6. The article of manufacture consisting of two or more layers of wood, A B, the adjacent surfaces of which are provided with small tongues *a* and grooves *b*, or *c c*, so formed and proportioned as to hold said layers together in part by lateral compression and friction when united by pressure thereon while face to face, with glue or cement between them, substantially as shown and described.

In testimony that I claim the foregoing as my own invention I affix my signature in presence of two witnesses.

DANIEL M. CUMMINGS.

Witnesses:

J. G. SPENCER,

F. H. WELLS.